(12) United States Patent
Sakai et al.

(10) Patent No.: US 6,973,829 B2
(45) Date of Patent: Dec. 13, 2005

(54) SEMICONDUCTOR DYNAMIC QUANTITY SENSOR WITH MOVABLE ELECTRODE AND FIXED ELECTRODE SUPPORTED BY SUPPORT SUBSTRATE

(75) Inventors: Minekazu Sakai, Kariya (JP); Yoshiyuki Kato, Chiryu (JP); Minoru Murata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/925,021

(22) Filed: Aug. 9, 2001

(65) Prior Publication Data
US 2002/0023492 A1 Feb. 28, 2002

(30) Foreign Application Priority Data
Aug. 29, 2000 (JP) .............................. 2000-259399
Feb. 2, 2001 (JP) .............................. 2001-027439

(51) Int. Cl.⁷ ......................................... G01P 15/125
(52) U.S. Cl. ................................................ 73/514.32
(58) Field of Search ..................... 73/514.32, 504.12, 73/504.14, 514.18, 514.24, 514.38; 361/280, 361/283.1, 283.3

(56) References Cited

U.S. PATENT DOCUMENTS

| | | | | |
|---|---|---|---|---|
| 5,500,549 A | * | 3/1996 | Takeuchi et al. | 73/514.36 |
| 5,574,222 A | * | 11/1996 | Offenberg | 73/514.32 |
| 6,065,341 A | | 5/2000 | Ishio et al. | 73/514.32 |
| 6,151,966 A | | 11/2000 | Sakai et al. | 73/514.32 |
| 6,291,875 B1 | * | 9/2001 | Clark et al. | 257/622 |
| 6,450,031 B1 | * | 9/2002 | Sakai et al. | 73/514.16 |

FOREIGN PATENT DOCUMENTS

| | | |
|---|---|---|
| JP | A-7-131036 | 5/1995 |
| JP | A-8-15308 | 1/1996 |
| JP | A-11-304834 | 11/1999 |
| JP | A-2000-165952 | 6/2000 |

OTHER PUBLICATIONS

U.S. Appl. No. 09/306,381, filed May 6, 1999, Muto et al.

* cited by examiner

*Primary Examiner*—John E. Chapman
(74) *Attorney, Agent, or Firm*—Posz Law Group, PLC

(57) ABSTRACT

A semiconductor dynamic quantity sensor has a support substrate with a rectangular opening portion, and a movable electrode and fixed electrodes are respectively supported by the support substrate through supporting portions to face the opening portion. The supporting portions supporting the movable electrode are arranged in a direction approximately the same as that in which the supporting portions supporting the fixed electrodes are arranged.

15 Claims, 11 Drawing Sheets

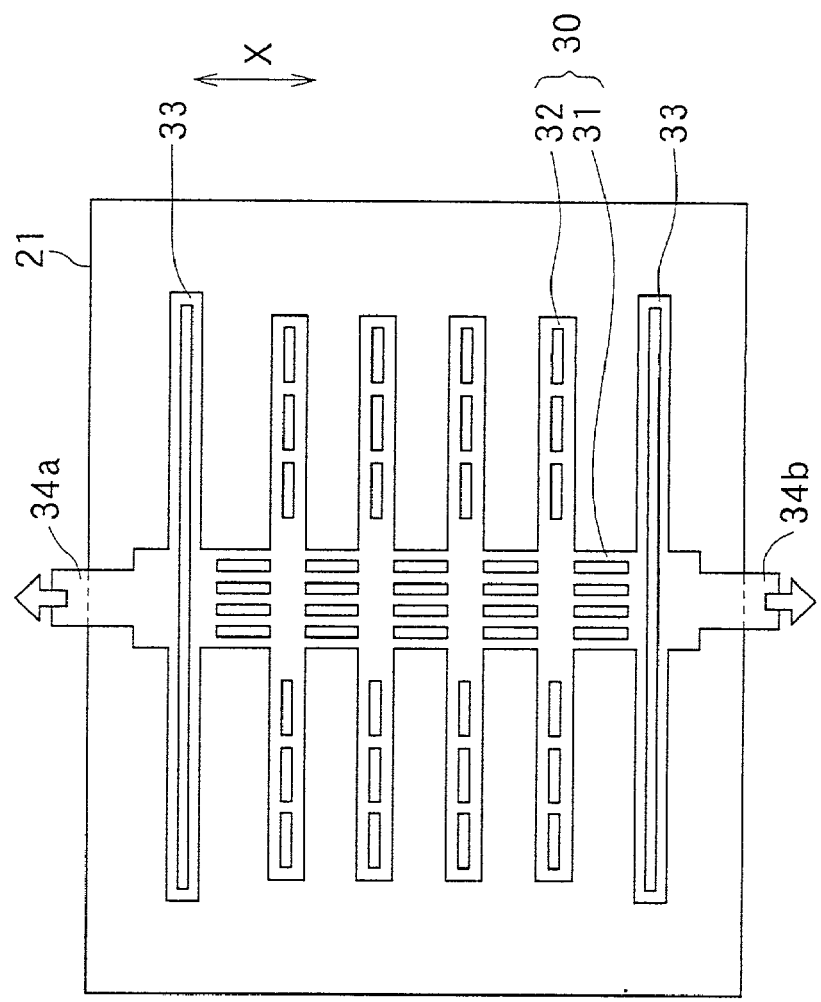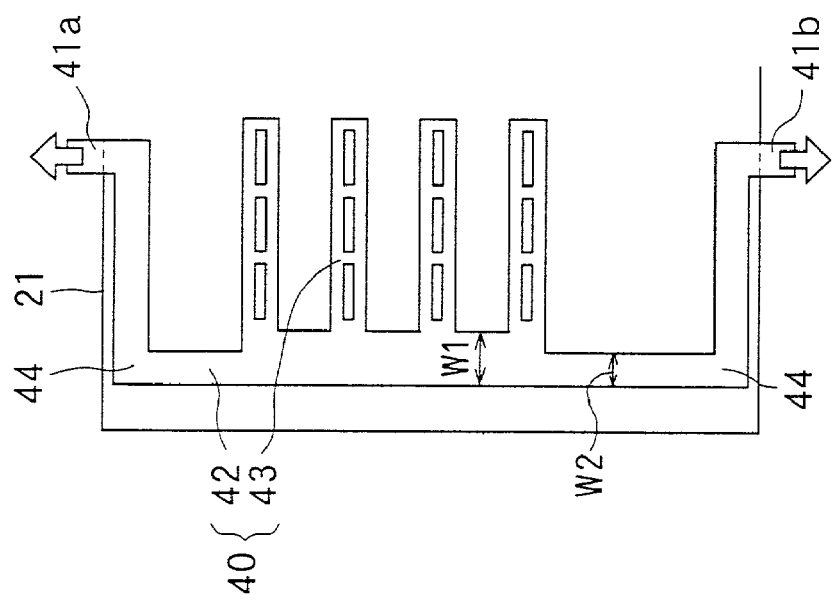

SEMICONDUCTOR DYNAMIC QUANTITY SENSOR WITH MOVABLE ELECTRODE AND FIXED ELECTRODE SUPPORTED BY SUPPORT SUBSTRATE

CROSS REFERENCE TO RELATED APPLICATIONS

This application is based upon and claims the benefit of Japanese Patent Applications No. 2000-259399 filed on Aug. 29, 2000, and No. 2001-27439 filed on Feb. 2, 2001, the contents of which are incorporated herein by reference.

BACKGROUND OF THE INVENTION

1. Field of the Invention

This invention relates to a semiconductor dynamic quantity sensor having a movable electrode and a fixed electrode for detecting a dynamic quantity applied thereto based on a change in interval between the movable electrode and the fixed electrode.

2. Description of the Related Art

This kind of semiconductor dynamic quantity sensor is disclosed in, for example, JP-A-11-326365. FIGS. 1A and 1B show a constitution of this kind of semiconductor dynamic quantity sensor.

The sensor is, as shown in FIG. 1B, formed by performing a micro-machining technique to a semiconductor substrate composed of a first semiconductor layer 201, a second semiconductor layer 202, and an insulation layer 203 interposed between the semiconductor layers 201, 202. For example, the semiconductor layers 201, 202 are made of silicon (Si), and the insulation layer 203 is a Si oxide film.

A beam structure, which is composed of a movable electrode 204 and fixed electrodes 205 opposed to the movable electrode 204 with detection intervals 206 defined therebetween, is defined by grooves in the second semiconductor layer 202 of the semiconductor substrate. In the figures, each of the electrodes 204, 205 has a comb-shape. The movable electrode 204 has a weight portion 207 and several pole portions 208 projecting from the weight portion 207, and the fixed electrodes 205 have several pole portions 209, each of which faces aside face of a corresponding pole portion 208.

The first semiconductor layer 201 and the insulation layer 203 constitute a support substrate, and an opening portion 210 open at a side of the second semiconductor layer 202 is formed in the support substrate. In this example, the opening portion 210 is a rectangle and passes through both the first semiconductor layer 201 and the insulation layer 203 in the thickness direction thereof.

A pair of opposed sides forming the opening portion 210 fixedly support both ends of the weight portion 207 with elasticity. The movable electrode 204 can displace above the opening portion 210 in a direction indicated by arrow X in FIG. 1A upon receiving a dynamic quantity (such as acceleration). Supporting portions 211 of the fixed electrodes 205 are fixedly supported by another pair of opposed sides forming the opening portion 210, different from those supporting the weight portion 207.

In the semiconductor dynamic quantity sensor described above, when the movable electrode 204 is displaced in response to the dynamic quantity applied thereto, the dynamic quantity is detected based on changes of the detection intervals 206.

SUMMARY OF THE INVENTION

However, according to studies and experiments by the inventors, it is revealed that the above-described semiconductor dynamic quantity sensor has the following problem. That is, the respective parts of the support substrate 201, 203 and the beam structure 204, 205 have thermal expansion coefficients different from one another. Therefore, these parts deform with temperature change differently, so that the detection intervals 206 between the movable electrode 204 and the fixed electrodes 205 are widened or narrowed. This results in deteriorated temperature characteristics.

Especially in the sensor shown in FIGS. 1A and 1B, the support substrate 201, 203 is bonded, at a lower side thereof (at the side of the first semiconductor layer 201), to a package 212 through adhesive (made of, for example, polyimide). The package 212 is made of ceramic (such as alumina) having a thermal expansion coefficient larger than that of the support substrate.

Therefore, deformations as shown in FIGS. 2A and 2B occur due to differences in thermal expansion coefficient among Si, the Si oxide film, the adhesive, and the package. For example in a case where temperature is lowered from a room temperature, because shrinkage of the ceramic package 212 is larger than that of the support substrate, the support substrate 201, 203 deforms convexly as shown in FIG. 2B. Such convex deformation of the support substrate occurs along a direction indicated with arrow X in FIG. 2A and a direction perpendicular to the direction X.

In this case, the movable electrode 204 deforms to expand in the direction X. To the contrary, each fixed electrode 205 deforms in a fan shape. That is, referring to FIG. 2A, comparing two pole portions 209a, 209b of the fixed electrode 205 disposed at both ends in the direction X in FIG. 2A, the detection interval 206 is narrowed by the upper side pole portion 209a, while the detection interval 206 is widened by the lower side pole portion 209b.

Thus, in the above-described semiconductor dynamic quantity sensor, the detection interval varies with the temperature change because the fixed electrode and the movable electrode deform differently from each other due to differences in thermal expansion coefficient among the materials forming the respective parts such as the movable electrode, the fixed electrodes, the support substrate, the package, and the adhesive.

The present invention has been made in view of the above problems, and an object of the present invention is to provide a semiconductor dynamic quantity sensor capable of suppressing a change in detection interval caused by a change in temperature.

According to a first aspect of the present invention, a semiconductor dynamic quantity sensor has a support substrate having an opening portion open on a surface thereof, a movable electrode supported by the support substrate through first and second movable electrode supporting portions, and a fixed electrode supported by the support substrate through first and second fixed electrode supporting portions to face the movable electrode with a detection interval defined therebetween. The first and second movable electrode supporting portions are provided on opposed sides of the opening portion, the same as those on which the first and second fixed electrode supporting portions are provided.

According to a second aspect of the present invention, first and second movable electrode supporting portions are arranged in a direction approximately parallel to a direction in which first and second fixed electrode supporting portions are arranged.

In the present invention as described above, because the movable electrode supporting portions and the fixed electrode supporting portions are respectively arranged (separated) in an identical direction with each other, a direction in which stress is applied due to deformation of the support substrate becomes approximately the same in the movable electrode and in the fixed electrode. That is, the movable electrode and the fixed electrode deform approximately in the same direction with temperature change. As a result, a change in detection interval between the movable electrode and the fixed electrode caused by the temperature change can be suppressed effectively.

According to a third aspect of the present invention, a semiconductor dynamic quantity sensor has a frame member, a movable electrode supported by the frame member to be displaced in a displacement direction by a dynamic quantity applied thereto, and a fixed electrode supported by the frame member and having a detection surface facing a detection surface of the movable electrode while defining a detection interval. A width of the frame member in the displacement direction of the movable electrode is uniform.

When the width of the frame member is uniform in the displacement direction of the movable electrode, the displacement of the movable electrode becomes uniform even when the frame member is deformed with temperature change, thereby preventing output variation.

BRIEF DESCRIPTION OF THE DRAWINGS

Other objects and features of the present invention will become more readily apparent from a better understanding of the preferred embodiments described below with reference to the following drawings, in which:

FIGS. 7A and 7B are explanatory views for explaining advantages of the first embodiment;

DETAILED DESCRIPTION OF THE PREFERRED EMBODIMENTS (First Embodiment)

Figure 3:
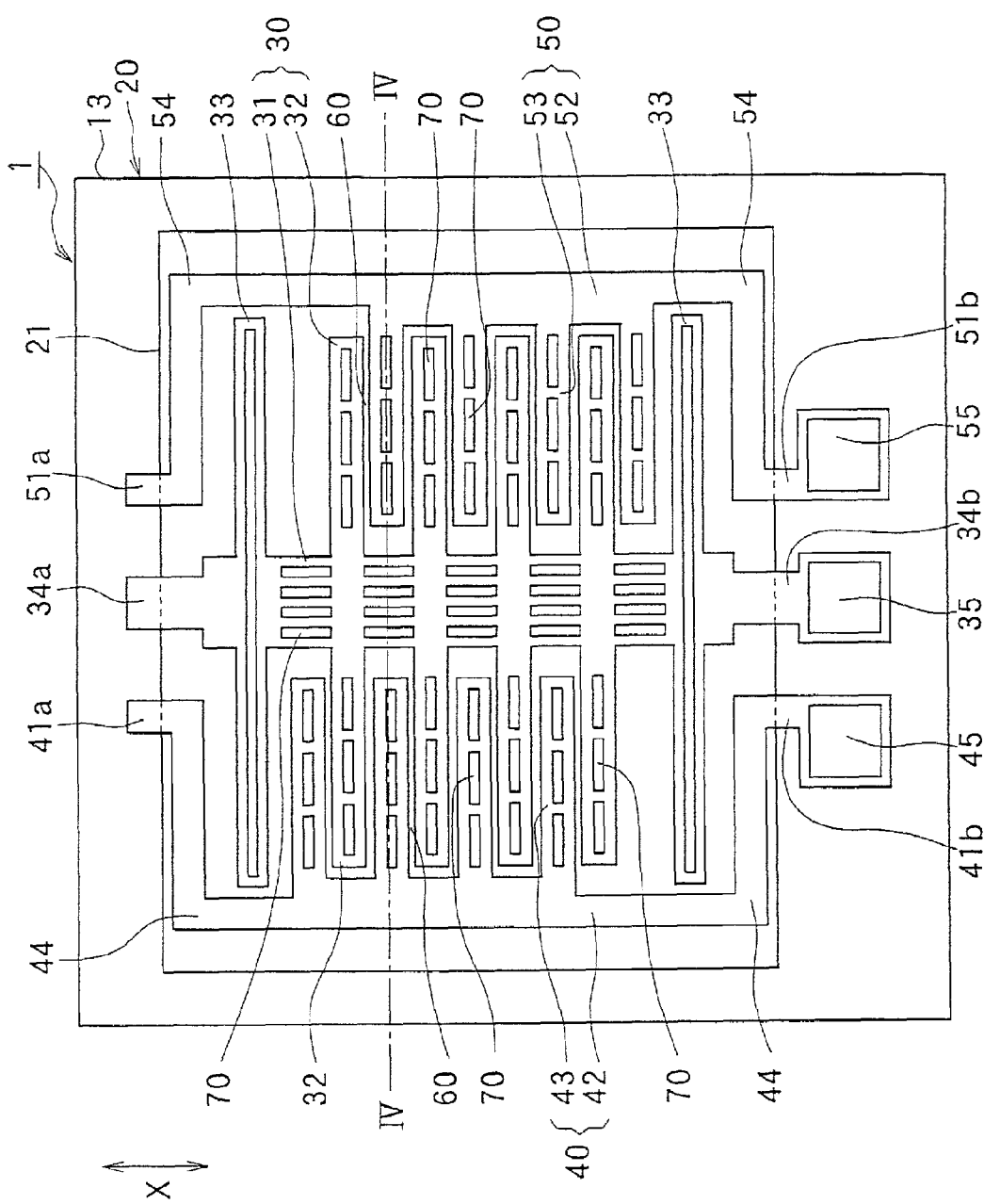
FIG. 3 is a plan view showing a semiconductor acceleration sensor according to a first preferred embodiment of the present invention.
Figure 4:
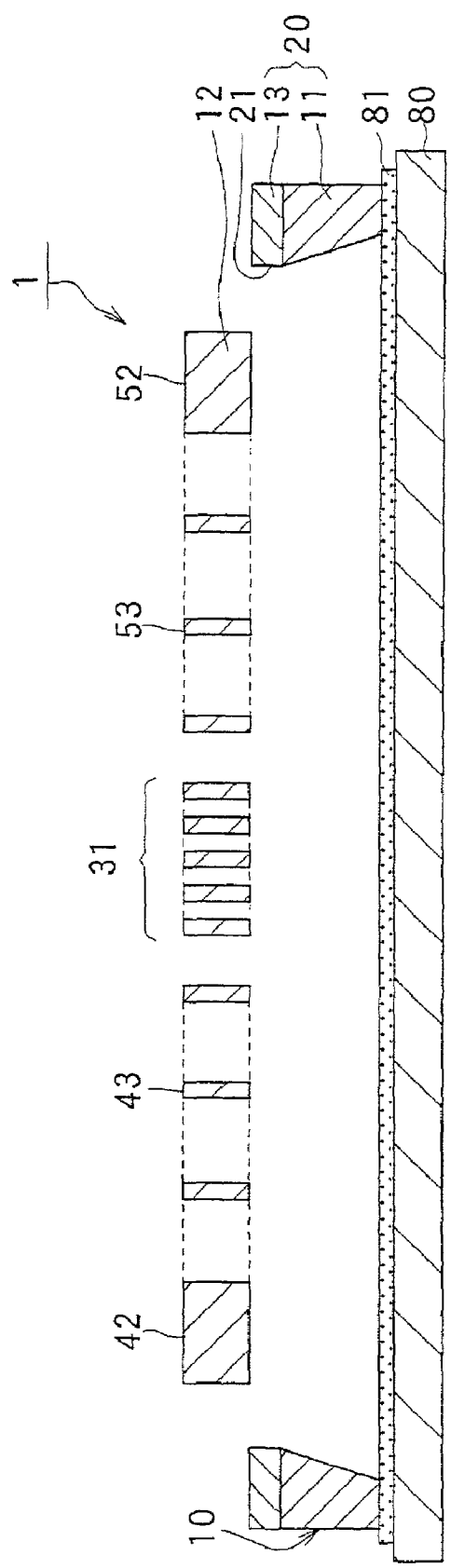
FIG. 4 is a cross-sectional view taken along line IV—IV in FIG. 3.

In a first preferred embodiment, the present invention is applied to a differential capacitance type semiconductor acceleration sensor 1 shown in FIGS. 3 and 4 adopted as a capacitance type dynamic quantity sensor.

Referring to FIGS. 3 and 4, the sensor 1 is formed by performing micro-machine processing. A semiconductor substrate forming the sensor 1 is, as shown in FIG. 4, an SOI (Silicon On Insulator) substrate 10 that is composed of a first silicon substrate 11 as a first semiconductor layer, a second silicon substrate 12 as a second semiconductor layer, and an oxide film 13 as an insulation layer interposed between the first and second silicon substrates 11 and 12. The first silicon substrate 11 and the oxide film 13 constitute a support substrate 20 in the present invention.

An opening portion 21 is formed in the support substrate 20 to be open on a surface of the support substrate 20 at a side of the second silicon substrate 21. A beam structure, which is composed of a movable electrode 30 and fixed electrodes 40, 50, is formed in the second silicon substrate 12 by forming grooves therein. In the present embodiment, the opening portion 21 is formed by etching a rectangular portion of the support substrate 20 where the beam structure 30 to 50 is to be formed, so as to penetrate the support substrate 20 in the thickness direction thereof.

The movable electrode 30 made of semiconductor (silicon in this embodiment) is supported by the support substrate 20 and displaced in response to a dynamic quantity applied thereto. In the present embodiment, the movable electrode 30 crosses above the opening portion 21 between opposed (facing) sides defining the opening portion 21. The movable electrode 30 is composed of a rectangular weight portion 31 and pole portions (movable pole portions) 32 protruding from the weight portion 31.

The weight portion 31 is integrally connected to anchor portions 34a, 34b through beam portions 33 (having a rectangular frame shape) at both ends thereof. Specifically, the anchor portions 34a, 34b are fixedly supported by the support substrate 20 at the opposed sides (edge portions) of the opening portion 21. Each anchor part works as a supporting portion of the movable electrode to the support substrate.

The movable pole portions 32 protrude from both sides of the weight portion 31 in opposite directions to each other, perpendicularly to direction X in which the movable electrode is displaced. The number of the movable pole portions 32 is four at each side of the weight portion 31 in this embodiment. Each of the movable pole portions 32 has a beam shape with a rectangular cross-section.

Each of the beam portions 33 has a spring function so that it deforms in a direction perpendicular to a longitudinal direction of beams thereof. The beam portions 33 displace the weight portion 31 in the direction X when acceleration having a component in the direction X is applied thereto, and restore the weight portion 31 to the initial position thereof in accordance with disappearance of the acceleration. Accordingly, the movable electrode 30 can be displaced above the opening portion 21 in response to acceleration applied thereto. Hereinafter, the direction X is referred to as displacement direction X.

Meanwhile, the fixed electrodes 40, 50 made of semiconductor (silicon in the present embodiment) are supported by the support substrate 20 and face the movable electrode 30 above the opening portion 21 while defining detection intervals 60 therebetween. In the present embodiment, the fixed electrodes 40, 50 are divided into a first fixed electrode 40 provided at the left side of the movable electrode 30 in FIG. 3, and a second fixed electrode 50 provided at the right side of the movable electrode 30, with an axis parallel to the displacement direction X.

Each of the fixed electrodes 40, 50 is disposed to cross the opening portion 21 in an identical direction with the movable electrode 30, and are fixedly supported by the support substrate 20 through anchor portions 41a, 41b, 51a, 51b at both ends thereof. That is, the two anchor portions of each fixed electrode 40 or 50 are positioned on the opposed sides of the opening portion 21 the same as those where the anchor portions 34a, 34b of the movable electrode 30 are provided, and work as supporting portions of the fixed electrode to the support substrate.

Each of the fixed electrodes 40, 50 is composed of a connecting portion 42, 52 connected to the anchor portions 41a, 41b, 51a, 51b, and pole portions (fixed pole portions) 43, 53 protruding from the connecting portion 42, 52. The fixed pole portions 43 respectively face the side faces of the movable pole portions 32 at side faces thereof while defining the above-described detection intervals 60.

Each fixed electrode 40, 50 has the several (four in the present embodiment) fixed pole portions 43, 53 each of which extends from the connecting portion 42, 52 in a direction perpendicular to the displacement direction X of the movable electrode 30. Each fixed pole portion 43, 53 has a beam shape with a rectangular cross-section. Further, each connecting portion 43, 53 has bent portions (L-shaped portions in the figure) 44, 54 that elongate toward the anchor portions 34a, 34b.

Thus, in the present embodiment, the anchor portions 34a, 34b of the movable electrode 30, and the anchor portions 41a, 41b, 51a, 51b of the fixed electrodes 40, 50 are respectively positioned on the opposed edge portions (opposed sides) of the opening portion 21. That is, the direction in which the anchor portions 34a, 34b are separated from each other by the opening portion 21 is substantially parallel not only to the direction in which the anchor portions 41a, 41b of the first fixed electrode 40 are separated from each other, but also to the direction in which the anchor portions 51, 51b of the second fixed electrode 50 are separated from each other.

In other words, the direction in which the anchor portions 34a, 34b are arranged with the intervening opening portion 21 is substantially parallel to the direction in which the anchor portions 41a, 41b of the first fixed electrode 40 are arranged, and to the direction in which the anchor portions 51, 51b of the second fixed electrode 50 are arranged.

In the present embodiment, the opening portion is rectangular to realize the above-described arrangement. The anchor portion 34a of the movable electrode 30 and the anchor portions 41a, 51a of the fixed electrodes 40, 50 are arranged on one side of the opening portion 21, while the anchor portion 34b of the movable electrode 30 and the anchor portions 41b, 51b of the fixed electrodes 40, 50 are arranged on the opposite side of the opening portion 21.

Further, as shown in FIG. 3, axes connecting the anchor portions 34a, 34b of the movable electrode 30, connecting the anchor portions 41a, 41b, 51a, 51b of the fixed electrodes 40, 50 are parallel to the displacement direction X of the movable electrode 30.

The movable electrode 30, the first fixed electrode 40, and the second fixed electrode 50 are electrically independent of one another, and capacitances (detection capacitances) are formed in the detection intervals 60 between the movable pole portions 32 and the respective fixed pole portions 43, 53. The capacitance produced in the detection intervals 60 between the movable pole portions 32 and the fixed pole portions 43 of the first fixed electrode 40 is referred to as a first capacitance CS1, and the capacitance produced in the detection intervals 60 between the movable pole portions 32 and the fixed pole portions 53 of the second fixed electrode 50 is referred to as a second capacitance CS2.

A movable electrode pad 35 electrically communicating with the movable electrode 30, a first fixed electrode pad 45 electrically communicating with the first fixed electrode 40, and a second fixed electrode pad 55 electrically communicating with the second fixed electrode 50 are respectively provided on predetermined positions of the support substrate 20. In the example shown in FIG. 3, these pads 35, 45, 55 are made of, for example, aluminum, and are formed to respectively electrically communicate with the anchor portions 34b, 41b, 51b provided at the lower side in FIG. 3.

In addition, rectangular through holes 70 are formed in the weight portion 31, the movable pole portions 32, and the respective fixed pole portions 43, 53 to penetrate them, thereby providing a rigid-frame structure. Accordingly, the movable electrode 30 and the respective fixed electrodes 40, 50 can be lightened, and a torsional strength can be improved.

As shown in FIG. 4, the sensor 1 is fixedly adhered to a package 80 at a back surface of the first silicon substrate 11 (at an opposite side of the oxide film 13) through adhesive 81 such as polyimide resin. This package 80 is made of ceramic such as alumina, and a circuit unit (detection circuit) 90 described below is accommodated in the package 80. The circuit unit 90 is electrically connected to the respective electrode pads 35, 45, 52 by wire bonding with wires (not shown) made of gold or aluminum.

Figure 5:
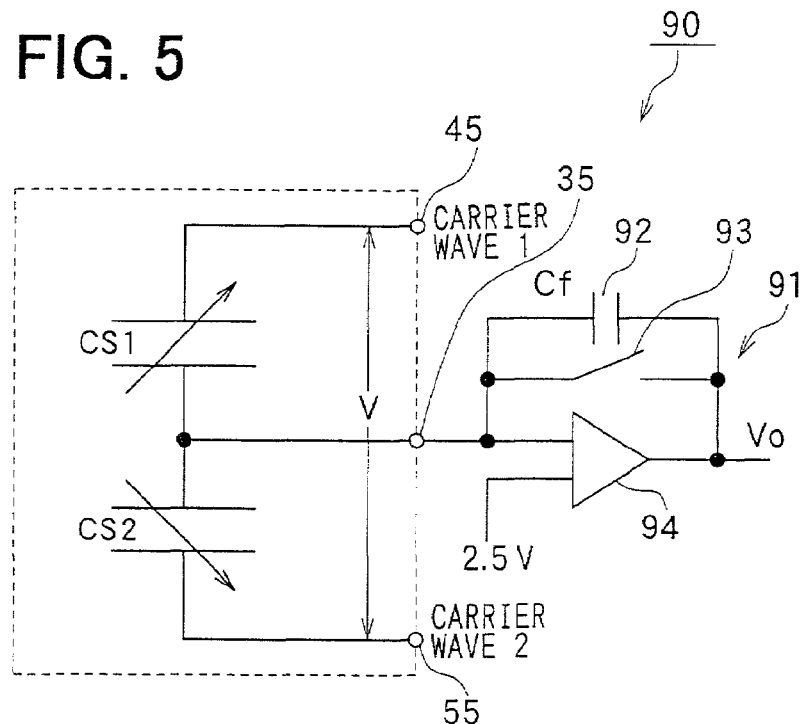
FIG. 5 is a diagram showing a detection circuit of the semiconductor acceleration sensor shown in FIGS. 3 and 4.

Next, an operation of the sensor 1 constructed as above is explained. The sensor 1 is a differential capacitance type acceleration sensor that detects an acceleration based on a differential capacitance between the first detection capacitance (CS1) and the second detection capacitance (CS2) when the movable electrode 30 is displaced in the displacement direction X by acceleration applied thereto. FIG. 5 shows the detection circuit 90 in the sensor 1.

The detection circuit 90 has a switched capacitor circuit (SC circuit) 91. The SC circuit 91 is composed of a capacitor 92 having capacitance Cf, a switch 93, and a differential amplifier 94, and converts a differential capacitance (CS1−CS2) inputted therein into a voltage, thereby detecting the applied acceleration.

Figure 6:
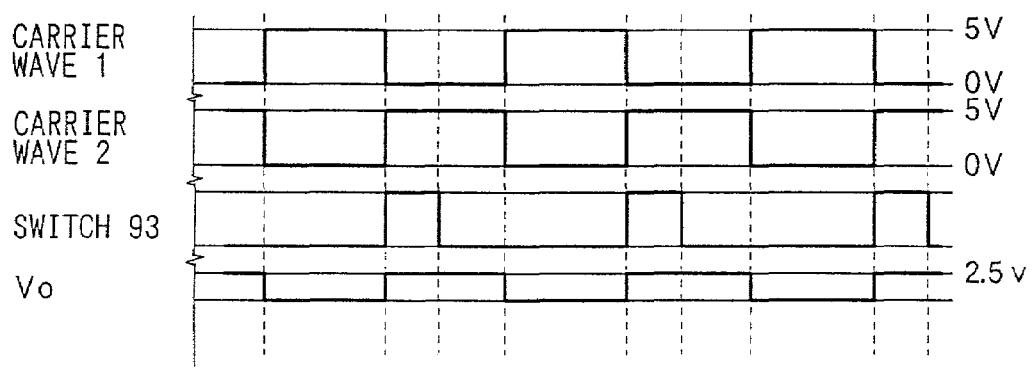
FIG. 6 is a timing chart with respect to the detection circuit shown in FIG. 5.

FIG. 6 shows, as an example, a timing chart with respect to the detection circuit 90. In the sensor 1, for example, carrier wave 1 (frequency: 100 kHz, amplitude: 0–5V) is inputted through the first fixed electrode pad 45, while carrier wave 2 (frequency: 100 kHz, amplitude: 5—0V), a phase of which is shifted from that of the carrier wave 1 at 180°, is inputted through the second fixed electrode pad 55. Then, the switch 93 of the SC circuit 91 is opened and closed at the timings shown in the chart. The applied acceleration is then outputted as voltage $V_O$ that is represented by formula (1):

$$V_O=(CS1-CS2)\cdot V/Cf \tag{1}$$

In the formula (1), V is a difference in voltage between the pads 45 and 55. The acceleration along the displacement direction X of the movable electrode 30 can be detected based on the voltage $V_O$ outputted as above.

Figure 8:
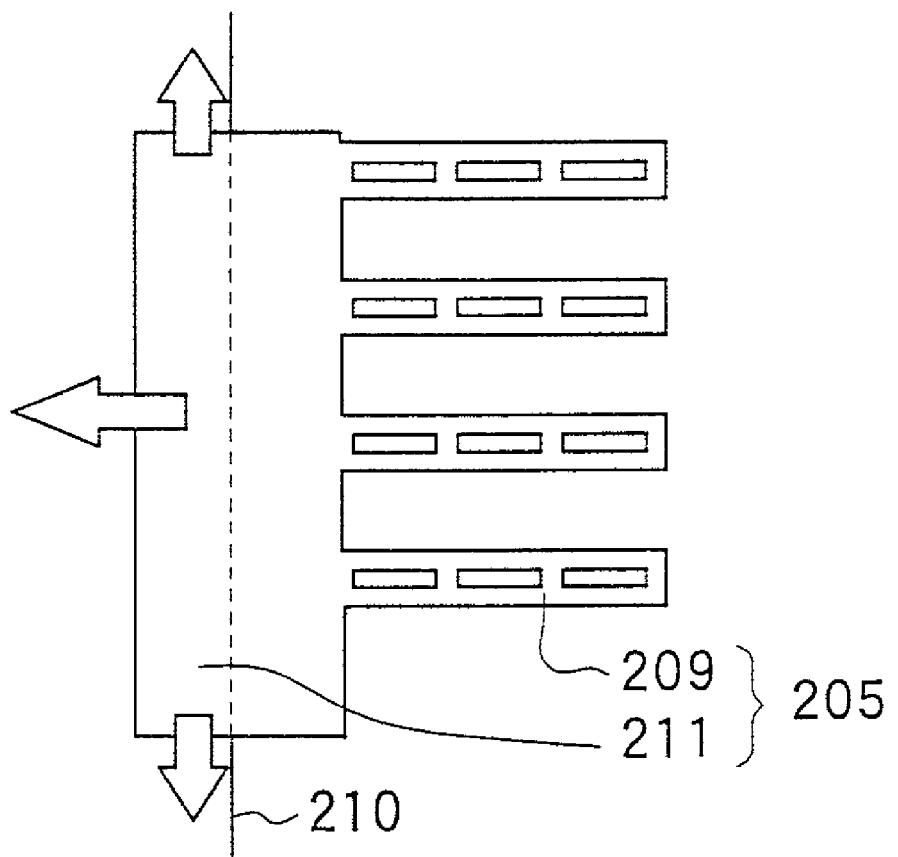
FIG. 8 is a schematic view showing directions in which stress is applied to a fixed electrode in a conventional semiconductor dynamic quantity sensor.

In the sensor 1, when temperature changes, the support substrate 20 is deformed (for example, warped) due to the differences in thermal expansion coefficient among the materials (semiconductor, oxide film, resin, ceramic) forming the movable and fixed electrodes 30, 40, 50, the support substrate 20, the adhesive 81, and the package 80. For example, it is considered that the surface of the support substrate 20, on which the beam structure 30 to 50 is formed, is deformed convexly. FIGS. 7A and 7B are views for explaining advantages of the present embodiment in such a case. FIG. 8 is a view showing directions in which stress is applied to the fixed electrode in a conventional semiconductor dynamic quantity sensor.

In the present embodiment, the anchor portions 34a, 34b of the movable electrode 30, the anchor portions 41a, 41b of the first fixed electrode 40, and the anchor portions 51a, 51b of the second fixed electrode 50 are respectively arranged and separated from each other approximately in the identical direction, with the opening portion 21 intervening therebetween. Therefore, directions in which stresses are respectively applied from the anchor portions to the movable electrode, and the fixed electrodes due to the deformation of the support substrate 20 are approximately identical with one another (i.e., approximately parallel to one another).

That is, referring to FIGS. 7A and 7B, even when the support substrate 20 is deformed convexly with the temperature change, the movable electrode 30, the first fixed electrode 40, and the second fixed electrode 50 respectively deform by expanding or shrinking in an approximately identical direction (in the displacement direction X of the movable electrode which is indicated by white arrows in FIGS. 7A and 7B), between the anchor portions 34a, 34b, between the anchor portions 41a, 41b, and between the anchor portions 51a, 51b.

Because of this, according to the present embodiment, the deforming direction of the movable electrode 30 is approximately parallel to the deforming directions of the fixed electrodes 40, 50. In consequence, the changes in the detection intervals 60 between the movable electrode 30 and the fixed electrodes 40, 50 caused by the temperature change can be suppressed as small as possible.

Figure 2A:
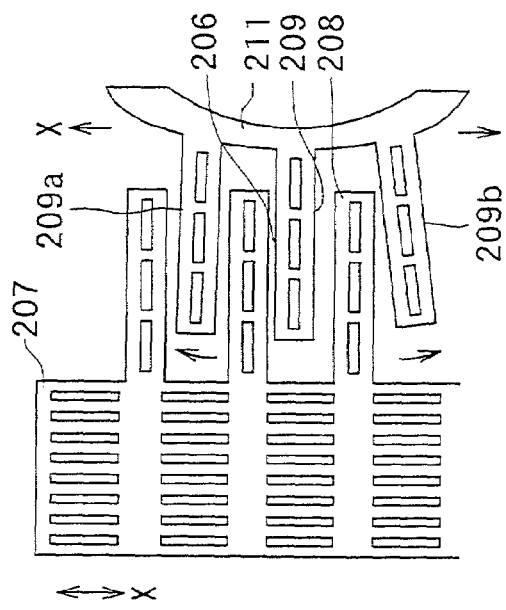
FIGS. 2A and 2B are schematic views for explaining problems of the semiconductor dynamic quantity sensor shown in FIGS. 1A and 1B.
Figure 2B:
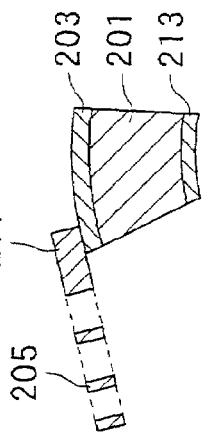
Figure 1A:
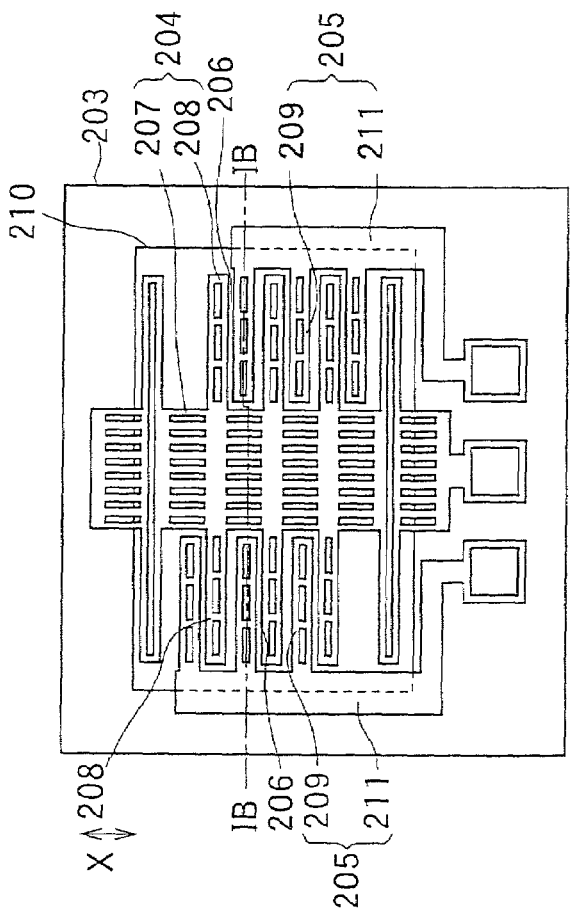
FIG. 1A is a plan view showing a semiconductor dynamic quantity sensor according to a prior art.
Figure 1B:
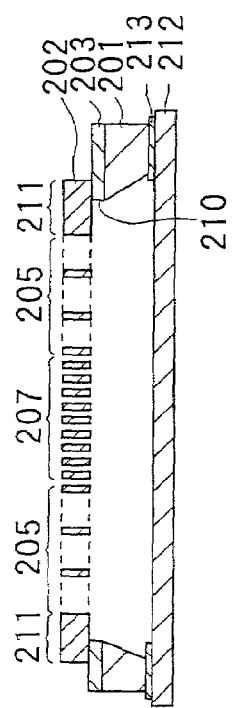
FIG. 1B is a cross-sectional view taken along line IB—IB in FIG. 1A.

In comparison with the present embodiment, in the conventional sensor shown in FIGS. 1A and 1B, the supporting portions 211 of the fixed electrodes 205 are provided at opposite sides (edge portions) of the opening portion 210 different from those to which the movable electrode 204 is connected. Therefore, if the support substrate 201, 203 is deformed convexly, as shown in FIG. 8, stress is applied to the fixed electrodes 205 in directions shown with arrows in a difficult manner from the movable electrode 204. As a result, in the conventional sensor, the detection intervals change largely due to the difference in the way of deformation between the movable electrode and the fixed electrode.

Especially in the present embodiment, as shown in FIG. 3, it is preferable that the axis connecting the anchor portions 34a, 34b of the movable electrode 30 is parallel to the axes connecting the anchor portions 41a, 41b, and 51a, 51b of the respective fixed electrodes 40, 50. Accordingly, the directions in which stresses are applied from the anchor portions to the electrodes due to the deformation of the support substrate 20 coincide with each other in the movable electrode and the fixed electrodes. As a result, the changes in the detection intervals 60 can be suppressed effectively.

In addition, according to the present embodiment, referring again to FIG. 7A, the connecting portion 42, 52 of the fixed electrode 40, 50 has width W1 where the pole portions 43, 53 are provided. The width W1 is larger than width W2 at the other portions of the connecting portion 42, 52 such as the bent portions 44, 54. That is, the connecting portion 42, 52 is widened at the root portions of the pole portions 43, 53 (more specifically, at portions respectively connecting two pole portions) as compared to the other portions to securely support the pole portions 43, 53. Therefore, the pole portions 43, 53 are prevented from expanding in a fan-like shape. Here, the widths W1, W2 are dimensions of the connecting portion 43, 53 in the direction perpendicular to the displacement direction X of the movable electrode 30.

In the sensor 1, the movable electrode 30 is composed of the weight portion 31 and the pole portions 32, and each fixed electrode 40, 50 is composed of the connecting portion 42, 52 and the pole portions 43, 53. Further, each connecting portion 42, 52 has the bend portions 44, 54 that are bent to respectively elongate toward the anchor portions 34a, 34b of the movable electrode 30.

According to this structure, both ends of the connecting portion 42, 52 can be made to approach the anchor portions 34a, 34b of the movable electrode 30 via the bent portions 44, 54. Therefore, the anchor portions 41a, 41b, 51a, 51b of the fixed electrodes 40, 50 can respectively approach the anchor portions 34a, 34b of the movable electrode 30, so that the difference of stresses applied to the movable electrode 30 and the fixed electrodes 40, 50 from the anchor portions can be reduced as small as possible.

The material forming the support substrate having the opening portion is not limited to semiconductor but may be other materials such as glass and ceramic. The shape of the opening portion is not limited to a rectangle but may be other shapes such as a circle, and a polygon other than a rectangle.

Further, it is not necessary for the opening portion to penetrate the support substrate, and the opening portion may be replaced with a recess opening on a surface of the support substrate. For example, in the SOI substrate 10 shown in FIG. 4, a recess may be formed as an opening portion by sacrificial etching so that the oxide film 13 is removed and the first silicon substrate 11 remains as a bottom of the recess.

Also, each of the movable electrode and the fixed electrodes can have various geometric shapes other than a comb shape provided that the movable electrode and the fixed electrodes can face each other while defining detection intervals therebetween. The number of the detection intervals may be one or more.

(Second Embodiment)

Figure 9A:
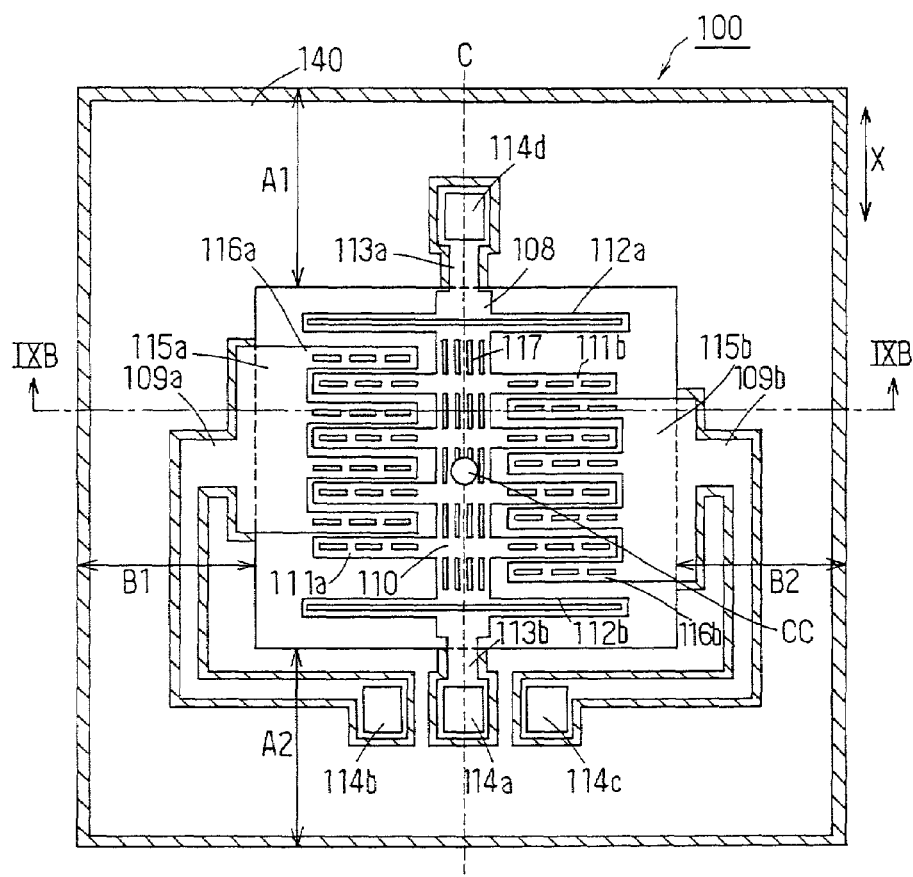
FIG. 9A is a plan view showing a capacitance type semiconductor acceleration sensor according to a second preferred embodiment of the present invention.
Figure 9B:
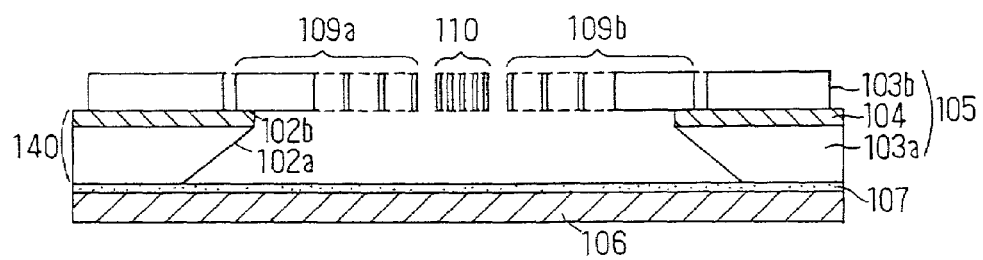
FIG. 9B is a cross-sectional view taken along line IXB—IXB in FIG. 9A.

Next, a capacitance type semiconductor acceleration sensor 100 in a second preferred embodiment is explained referring to FIGS. 9A and 9B, which is used for, for example, an air bag system, an ABS system, and the like for vehicles.

As shown in FIG. 9B, the acceleration sensor 100 is constituted by an SOI substrate 105 that is composed of a first semiconductor layer 103a made of single crystal silicon and having a frame shape with a through hole 102a therein, a second semiconductor layer (SOI layer) 103b made of single crystal silicon for detecting acceleration, and an embedded oxide film 104 provided between the first and second semiconductor layers 103a, 103b. The oxide film 104 is made of $SiO_2$ and has a through hole 102b. The oxide film 104 is a thermally oxidized film having a thermal expansion coefficient approximately equal to that of single crystal silicon forming the semiconductor layers 103a, 103b.

The second semiconductor layer 103b of the SOI substrate 105 is patterned into a specific shape by forming several grooves therein that reach the embedded oxide film 104, and as shown in FIG. 9A, it has a movable portion 108, a first fixed electrode cantilevered structure 109a, and a second fixed electrode cantilevered structure 109b.

The movable portion 108 is composed of a rectangular weight portion 110, comb-shaped movable electrodes 111a, 11b integrally formed with the weight portion 110, and beam portions 112a, 112b and anchor portions 113a, 113b that are provided at both ends of the weight portion 110. The anchor portions 113a, 113b are fixed to the first semiconductor layer 103a serving as a support substrate (frame member) 140 through the embedded oxide film 104. The beam portions 112a, 112b are respectively connected to the anchor portions 113a, 113b, and supported by them. The weight portion 110 and the movable electrodes 111a, 111b are then supported by the beam portions 112a, 112b. The movable electrodes 111a, 111b protrude in opposite directions to each other, perpendicularly to side faces of the weigh portion 110. Each movable electrode has pole portions each having a rectangular cross-section.

The beam portions 112a, 112b displace the weight portion 110 in direction X in FIG. 9A upon receiving acceleration including a component in the direction X, and restore the weight portion 110 to its initial position in accordance with disappearance of the acceleration. Thus, the movable portion 108 can be displaced in the displacement direction (direction X) of the beam portions 112a, 112b in response to the acceleration applied thereto.

An electrode pad 114d for wire bonding is formed on the anchor portion 113a of the movable portion 108 at one side. The electrode pad 104d is formed on the second semiconductor layer 103b that is provided on the first semiconductor layer 103a with the embedded oxide film 104 interposed therebetween. Similarly, an electrode pad 114a for wire bonding is formed on the anchor portion 113b of the movable portion 108 at the other side (at an opposite side of the electrode pad 114d). The electrode pad 114a is also formed on the second semiconductor layer 103b. Both the electrode pads 114a, 114b are made of aluminum.

The first fixed electrode cantilevered structure 109a is composed of a first fixed electrode supporting portion 115a and a first fixed electrode 116a. The first fixed electrode supporting portion 115a is supported by the second semiconductor layer 103b, and the first fixed electrode 116a has a comb-shape, a tooth part of which has a rectangular cross-shape. The comb-shaped first fixed electrode 116a is supported by the first fixed electrode supporting portion 115a, and has a side face (detection surface) facing a side face (detection surface) of the comb-shaped movable electrode 111a in parallel with each other while defining a given detection interval therebetween.

When acceleration is applied to the acceleration sensor 100, the movable electrode 111a is displaced, and a change of the relative position between the fixed electrode 116a and the movable electrode 111a is detected as a change in capacitance between the two electrodes.

Likewise, the second fixed electrode cantilevered structure 109b is composed of a second fixed electrode supporting portion 115b and a second fixed electrode 116b. The second fixed electrode supporting portion 115b is supported by the second semiconductor layer 103b, and the second fixed electrode 116b has a comb-shape, a tooth part of which is rectangular in cross-section. The comb-shaped second fixed electrode 116b is supported by the second fixed electrode supporting portion 115b, and faces a side face of the comb-shaped movable electrode 111b (at an opposite side of the detection interval defined by the movable electrode 111a) in parallel with each other while defining a given detection interval therebetween.

When acceleration is applied to the acceleration sensor 100, the movable electrode 111b is displaced, and a change of the relative position between the fixed electrode 116b and the movable electrode 111b is detected as a change in capacitance between the two electrodes.

An electrode pad 114b for wire bonding is formed on the fixed electrode supporting portion 115a of the first fixed electrode cantilevered structure 109a. The electrode pad 114b is formed on the second semiconductor layer 113b. Likewise, an electrode pad 114c for wire bonding is formed on the fixed electrode supporting portion 115b of the second fixed electrode cantilevered structure 109b. The electrode pad 114c is also formed on the second semiconductor layer 103b. The electrode pads 114b, 114c are made of aluminum.

Further, rectangular through holes 117 are formed in the weight portion 110, the fixed electrodes 116a, 116b, and the movable electrodes 111a, 111b, thereby providing a rigid-frame structure. Thus, the capacitance type acceleration sensor 100 is lightened.

In the present embodiment, referring to FIG. 9A, widths A1 and A2 of frame parts of the support substrate 140 (composed of the first semiconductor layer 103a), to which the anchor portions 113a, 113b of the movable portion 108 are respectively fixed, are equal to each other, i.e., satisfy a relation of A1=A2. Moreover, widths B1 and B2 of frame parts of the support substrate 140, to which the first fixed electrode supporting portion 115a and the second fixed electrode supporting portion 115b are respectively fixed, are equal to each other, i.e., satisfy a relation of B1=B2. The above widths may satisfy a relation of A1=A2 =B1=B2, or a relation of A1=A2≠B1=B2. The advantages by these relations of the widths are described later.

Figure 10A:
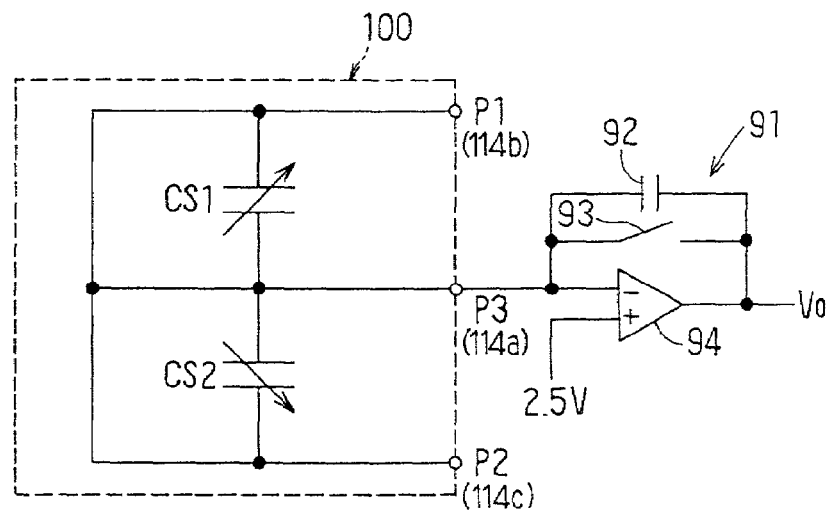
FIG. 10A is a diagram showing a detection circuit of the semiconductor acceleration sensor shown in FIGS. 9A and 9B.
Figure 10B:
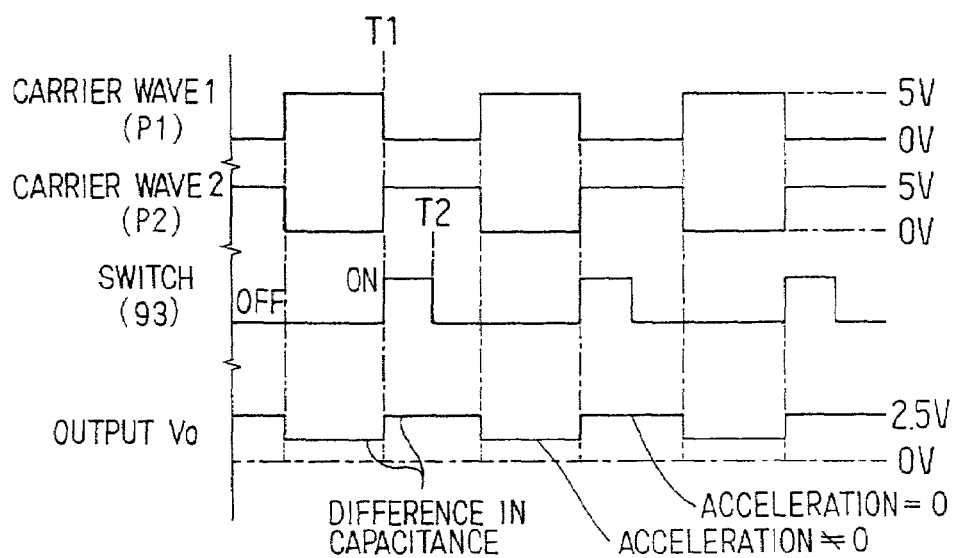
FIG. 10B is a timing chart with respect to the detection circuit shown in FIG. 10A.

Here, an operation of the acceleration sensor 100 is explained referring to FIGS. 10A and 10B, although it is similar to that in the first embodiment.

When acceleration including a component in the direction X in FIG. 9A is applied to the acceleration sensor 100, the weight portion 110 is displaced in the direction X. The displacement amount according to the acceleration is determined by the mass of the weight portion 110, the restoring forces of the beam portions 112a, 112b, and the electrostatic forces that act between the movable electrodes 111a, 11b and the fixed electrodes 116a, 116b under the acceleration applied thereto.

In this embodiment, first detection capacitance CS1 is produced between the movable electrode 111a and the first fixed electrode 116a, and second detection capacitance CS2 is produced between the movable electrode 111b and the second fixed electrode 116b. The acceleration sensor 100 can detect the acceleration applied thereto by taking out the changes of the capacitances CS1, CS2 through the electrode pads 114a, 114b, 114c, and 114d. Incidentally, the capacitances CS1, CS2 are controlled to be equal to each other when no acceleration is applied to the sensor 100.

Specifically, is, the fixed electrodes 116a, 116b positioned at the right and left sides in FIG. 9A are symmetrical with each other with respect to the movable electrodes 111a, 111b interposed therebetween to provide a condition of CS1=CS2. Here, it should be noted that parasitic capacitances produced by the first and second semiconductor layers 103a, 103b and others are not considered here to make the explanation brief.

Referring to FIG. 10B, in the sensor 100, a first carrier wave (carrier wave 1) formed by square waves (frequency: 100 kHz, voltage level: 5V) is applied to the electrode pad 114b of the first fixed electrode 116a. A second carrier wave (carrier wave 2) formed by square waves (frequency: 100 kHz, voltage level: 5V) having a phase shifted from that of the first carrier wave at 180° is applied to the electrode pads 114c of the second fixed electrode 116b. Although it is not shown, the first and second carrier wave signals are generated synchronizing clock signals from one oscillator circuit.

In the state where the first and second carrier wave signals are applied as described above, the potential at the electrode pads 114a, 114d of the movable electrodes 111a, 111b has a level corresponding to the capacitances CS1, CS2, and the potential level is detected by a switched capacitor circuit 91. The switched capacitor circuit 91 has an operational amplifier 94, a feedback capacitor 92, and a switch 93 which are connected as shown in FIG. 10A.

A signal (showing the potential level of the movable electrodes 111a, 111b) is inputted into an inversion input terminal of the operational amplifier 94 from the electrode pads 14a, 14d, and a voltage signal of 2.5V (corresponding to the potential level appearing at the electrode pads 114a, 114b when the capacitances CS1, CS2 are equal to each other) is inputted into a non-inversion input terminal of the operational amplifier 94.

The switch 93 is turned on or turned off by trigger signals generated synchronizing the clock signals from the oscillator circuit. Specifically, the switch 93 is turned on only for a given time period (shorter than ½ period of the first carrier wave signal), at a timing when the first carrier wave signal drops (corresponding to the timing when the second carrier wave signal arises).

The capacitance detection circuit shown in FIG. 10A operates as follows.

When the capacitances CS1, CS2 are equal to each other, at timing T1 shown in FIG. 10B, 0V is applied to the first fixed electrode 116a, 5V is applied to the second fixed electrode 116b, and 2.5V is applied to the movable electrodes 111a, 111b. At that time, because the switch 93 is turned on, the output voltage $V_0$ from the switched capacitor circuit 91 is 2.5V. At timing T2 when a specific time period is elapsed form the timing T1, the switch 93 is turned off. Because the voltages applied to the fixed electrodes 116a, 116b do not change, the output voltage does not change either.

Here, the output voltage changes in accordance with the change in differential capacitance of CS1, CS2, i.e., in accordance with the magnitude of acceleration applied to the weight portion 110. Therefore, the magnitude of the acceleration can be detected by utilizing the output voltage. That is, the output is generated due to the change in capacitance (CS1−CS2) that is caused by the changes of the intervals between the movable electrodes 111a, 111b and the fixed electrodes 116a, 116b.

Here, as shown in FIG. 9B, the support substrate 140 composed of the first semiconductor layer 103a and the embedded oxide film 104 is fixedly adhered to a package 106 made of ceramic through silicone-system or epoxy-system adhesive 107, at the back surface of the first semiconductor layer 103a (at an opposite side of the embedded oxide film 104). However, because the support substrate 140 can be considered to be made of metallic system material and the adhesive 107 bonding the support substrate 104 to the package 106 is made of resin material, the support substrate 140 and the adhesive 107 are different from each other in physical characteristics.

Especially, the support substrate 140 and the adhesive 107 are different from each other in thermal expansion coefficient. Because of this, when operation temperature of the acceleration sensor 100 changes, a deformation amount of the support substrate 140 is different from that of the adhesive 107 due to the difference in thermal expansion coefficient therebetween.

For example, when the operation temperature of the acceleration sensor 100 is lowered from a room temperature, because the thermal expansion coefficient of the adhesive 107 is lager than that of the support substrate 140, the adhesive 107 shrinks more largely than support substrate 140. As a result, the support substrate 140 deforms to be convex at the side of the package 106.

Incidentally, the thermal expansion coefficient of the package 106 made of ceramic is close to that of the support substrate 140 in comparison with that of the adhesive 107. Therefore, the effect to the support substrate 40 caused by the difference in thermal expansion coefficient between the package 106 and the support substrate 140 is negligible in the present embodiment.

Specifically, the thermal expansion coefficients of silicon forming the first and second semiconductor layers 103a, 103b, the adhesive 107, and the package 106 are 2.5 ppm/° C., 100–300 ppm/° C., and 7.7 ppm/° C., respectively. Thus, the difference in thermal expansion coefficient between silicon and adhesive 107 is large. Because the movable portion 108 and the fixed electrodes 106a, 106b are supported by the support substrate 140 composed of the first semiconductor layer 103a and the embedded oxide film 104, the deformation of the support substrate 140 caused by the temperature change is accompanied by deformation of the movable portion 108 and the fixed electrodes 106a, 106b.

Next, cases where the support substrate 40 is forcibly displaced are explained referring to diagrams shown in FIGS. 11A to 11D.

Figure 11A:
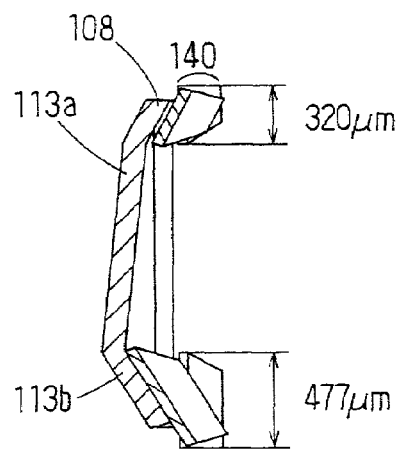
FIGS. 11A and 11B are schematic diagrams showing an acceleration sensor as a comparative example when the acceleration sensor is forcibly displaced.
Figure 11B:
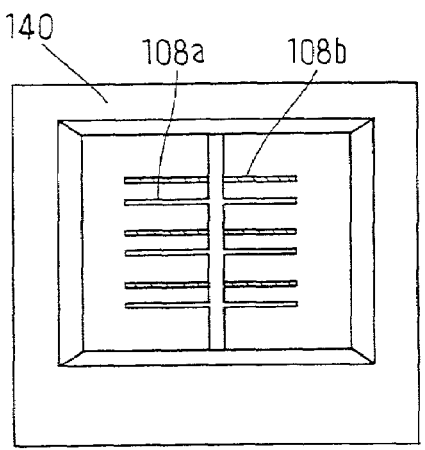

As shown in FIG. 11A, when the width of the frame-shaped support substrate 140 (the frame width of the support substrate 140 to which the anchor portion 113a or 113b is fixed) is not uniform, for example, as shown in FIG. 11B, when the lower part width of the support substrate 140 is larger than the upper part width thereof, the movable portion 108 moves in an obliquely upper direction from the position indicated by "108a" to the position indicated by "108b" in case where the support substrate is forcibly displaced (deformed).

Figure 12:
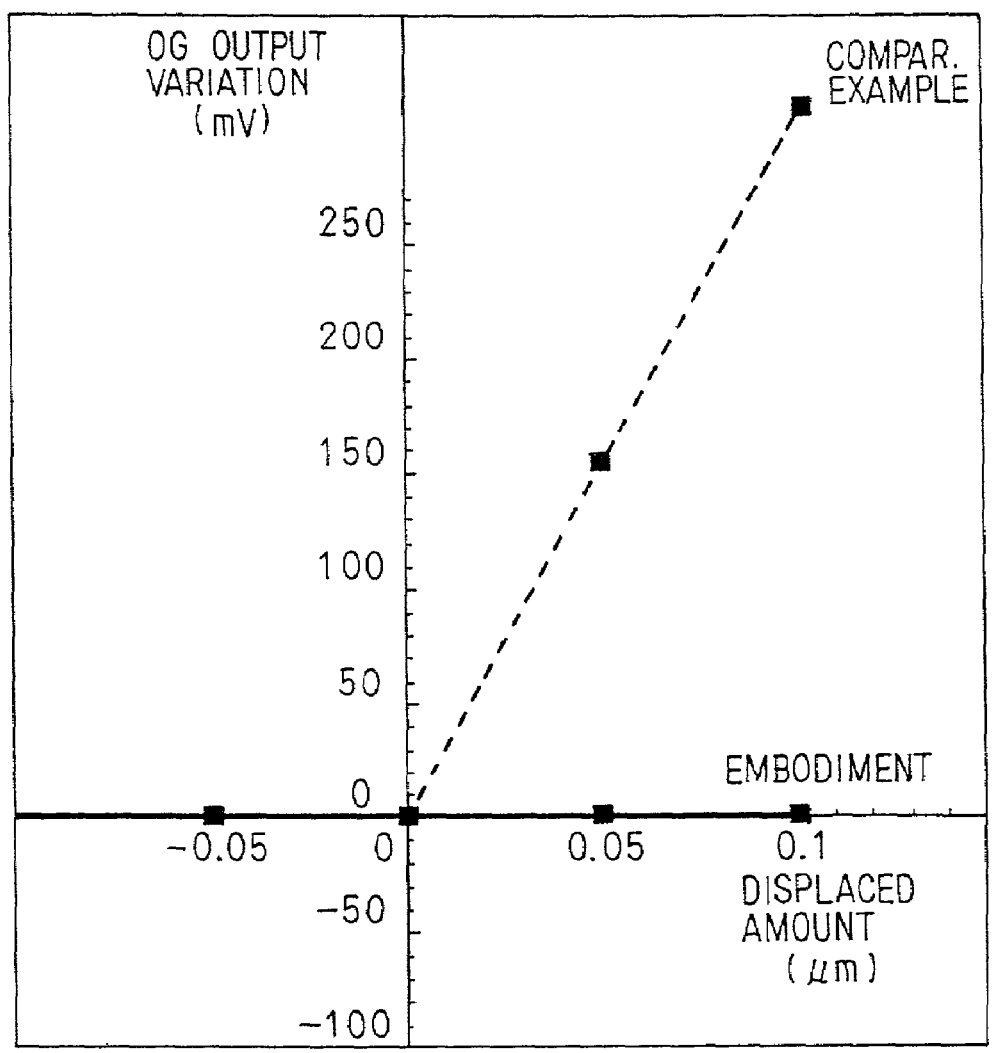
FIG. 12 is a graph showing output variations occurring when the acceleration sensors shown in FIGS. 11A to 11C are forcibly changed.

When the movable portion 108 moves from the position 108a to the position 108b, the intervals between the movable electrodes 111a, 111b and the fixed electrodes 116a, ,116b change to vary the sensor output. That is, the differential capacitance (CS1−CS2) between the capacitances CS1, CS2 changes. This result is shown in FIG. 12 with a broken line as a comparative example. In FIG. 12, a horizontal axis indicates a forcibly displaced amount of the support substrate 140, and a horizontal axis indicates the output variation. Incidentally, the respective facing areas between the movable electrodes 111a, 111b and the fixed electrodes 116a, 116b also change in this case. However, because the variations are approximately equal to one another, the effect is not significant.

Figure 11C:
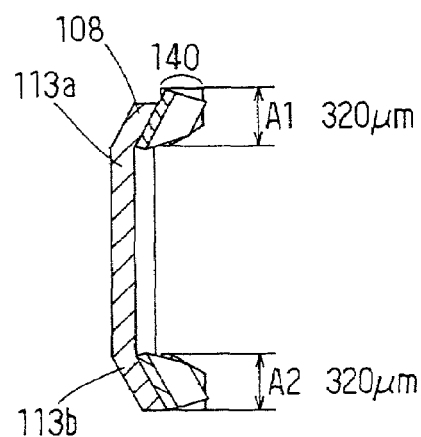
FIGS. 11C and 11D are schematic diagrams showing the acceleration sensor of the second embodiment when the acceleration sensor is forcibly displaced.
Figure 11D:
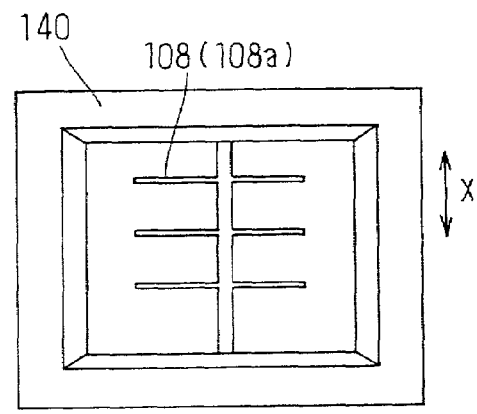

In this connection, in the present embodiment, as shown in FIG. 11C, the width of the support substrate 40 in the displacement direction X of the movable portion 108 including the movable electrodes 111a, 111b is made uniform. Accordingly, as shown in FIG. 11D, when the support substrate 140 is forcibly displaced, although the movable portion 108 is displaced upward as a whole (i.e., in the direction perpendicular to the paper space in FIG. 11D), the displacement is approximately perpendicular to the displacement direction X and the movable portion 108 is hardly displaced in the displacement direction X.

The intervals between the movable electrodes 111a, 111b and the fixed electrodes 116a, 116b do not change in this case. Therefore, even when the temperature changes to deform the support substrate 140, the change in differential capacitance (CS1−CS2) can be suppressed. As a result, the output variation caused by the temperature change can be suppressed as indicated by a solid line in FIG. 12.

Incidentally, when the movable portion 108 is displaced, because the beam portions 112a, 112b shown in FIG. 9A deform mainly, the deformation amount of the weight portion 110 supported by the beam portions 112a, 112b and the deformation amounts of the movable electrodes 111a, 111b are small.

In the present embodiment, the width of the support substrate 140 in the displacement direction X of the movable portion 108 is made uniform. However, the allowance in difference between the widths A1 and A2 of the support substrate 140 should be up to 30 μm in consideration of the processing variations such as when the through hole 102a is formed and when dicing is performed.

In view of suppressing the output variation, it is preferred that the difference between the widths A1 and A2 of the support substrate 140 is 15% or less of the shorter one. More preferably, the difference is 10% or less. In order to reduce the output variation remarkably, the difference should be 7% or less. For example, in the present embodiment, A1 is 320 μm, and A2 is 340 μm.

Further, in the present embodiment, the width of the support substrate 140 in the direction perpendicular to the displacement direction X of the movable portion 108 is made uniform as well.

If the width of the support substrate 140 in the direction perpendicular to the displacement direction X is not uniform, when the support substrate 140 is deformed with the temperature change, the facing areas between the movable electrodes 111a, 111b and the fixed electrodes 116a,116b change due to the difference in displacement amount between the fixed electrodes 116a, 116b. The changes of the facing areas occur differently to the detection capacitances CS1, CS2, resulting in output variation.

Therefore, according to the present embodiment, the width of the support substrate 140 in the direction perpendicular to the displacement direction X is also made uniform (B1=B2) so that the displacement amounts of the fixed electrodes 116a, 116 become uniform. As a result, the changes of the facing areas between the movable electrodes 111a, 11b and the fixed electrodes 116a, 116b also become uniform, thereby preventing output variation. The widths B1, B2 of the support substrate 140 as well as the widths A1, A2 thereof are allowable to have a specific difference therebetween as described above.

Referring to FIG. 9A, the center (centerline) of the movable portion 108 coincides with centerline C of the support substrate 140. That is, the anchor portions 113a, 113b of the movable portion 108 are positioned on the centerline C.

As described above, because the movable portion 108 is supported by the support substrate 140, the deformation of the support substrate 140 is accompanied by the deformation of the movable portion 8. In the present embodiment, the displacement of the movable portion 108 becomes uniform even when the support substrate 140 deforms with the temperature change, by positioning the center of the movable portion 108 on the centerline C of the support substrate 140. As a result, the displacement of the movable electrodes 111a, 111b to the sides of the fixed electrodes 116a, 116b can be restrained. The changes of the capacitances caused by the displacements of the movable electrodes 111a, 111b can be reduced to prevent the output variation due to the temperature change.

Specifically, the movable portion 108 is symmetrical with respect to the centerline C of the support substrate 140. Therefore, the deformation caused by the warp of the support substrate 140 (resulting in changes of the facing areas between the movable electrodes 111a, 111b and the fixed electrodes 116a, 116b) becomes uniform with respect to the fixed electrodes 116a, 116b. Therefore, the changes of the facing areas can be compensated by the differential output (CS1−CS2).

Further, the width in the direction of the frame sides of the support substrate 140 to which the anchor portions 113a, 113b are fixed is made small to reduce the displacement amount.

Further, in the present embodiment, the fixed electrode supporting portions 115a, 115b are point-symmetrical with respect to the center point CC of the support substrate 140. Because the fixed electrode supporting portions 115a, 115b that support the fixed electrodes 116a, 116b are supported by the support substrates 140, the deformation of the support substrate 140 is accompanied by the deformations of the fixed electrode supporting portions 115a, 115b.

In this connection, when the fixed electrode supporting portions 115a, 115b are point-symmetrical with respect to the center point CC of the support substrate 140, the deformations of the fixed electrode supporting portions 115a, 115b become uniform even when the support substrate 140 deforms with the temperature change. As a result, the displacements of the fixed electrodes 116a, 116b to the sides of the movable electrodes 111a, 111b can be restrained. In consequence, the changes of the capacitances caused by the displacements of the fixed electrode supporting portions 115a, 115b can be reduced, thereby preventing the output variation produced by the temperature change.

More specifically, the deformation amount of the first fixed electrode supporting portion 115a becomes equal to that of the second fixed electrode supporting portion 115b, and the changes in facing area between the movable electrode 111a and the fixed electrode 116a and between the movable electrode 111b and the fixed electrode 116b caused by this deformation become equal to each other. As a result, this effect can be compensated by the differential output (CS1−CS2).

In the present embodiment, the support substrate 140 has a square plane shape. If the plane shape of the support substrate 140 is irregular, the displacements of the movable portion 108 and the fixed electrodes 116a, 116b supported by the support substrate 140 are not uniform, so that the intervals between the movable electrodes 111a, 11b and the fixed electrodes 116a, 116b change.

However, in the present embodiment, because the plane shape of the support substrate 140 is a square, even when the support substrate 140 deforms with the temperature change, the displacements of the movable portion 108 and the fixed electrodes 116a, 116b are uniform, so that the changes in interval between the movable electrodes 111a, 111b and the fixed electrodes 116a, 116b can be reduced. This results in reduced changes of the capacitances caused by the displacements of the movable portions 108 and the fixed electrodes 116a, 116b. Further, the facing areas between the movable electrodes 111a, 111b and the fixed electrodes 116a, 116b change when the support substrate 140 deforms with the temperature change; however, by adopting the above-described structure, the changes of the facing areas become uniform.

As explained above, the present embodiment has the following five features that:

(a) the width of the support substrate 140 in the displacement direction X of the movable portion 108 is uniform;

(b) the width of the support substrate 140 in the direction in which the fixed electrodes 116a, 116b are supported is uniform;

(c) the centerline (axis determined by the anchor portions 113a, 113b) of the movable portion 108 coincides with the centerline C of the support substrate 140;

(d) the fixed electrode supporting portions 115a, 115b are point-symmetrical with respect to the center point of the support substrate 140; and (e) the plane shape of the support substrate 140 is square.

Of the above features (a) to (e), the features (b) to (e) are aimed to equalize the changes in facing area between the movable electrodes 111a, 111b and the fixed electrodes 116a, 116b at the sides of the detection capacitances CS1, CS2, respectively. The feature (a) is aimed to restrain the changes in interval between the movable electrodes 111a, 111b and the fixed electrodes 116a, 116b. The effect by the displacements of the fixed electrodes 116a, 116b can be principally reduced by taking the differential output; however, the displacements of the movable electrodes 111a, 111b directly affect the differential output. Therefore, it is preferable for the sensor to have the feature (a) at least. Here, it should be noted that it is not always necessary for the sensor to have all the above features (a) to (e).

Hereinafter, a method for manufacturing the acceleration sensor 100 having the above structure is explained referring to FIGS. 13A to 13F.

Figure 13A:
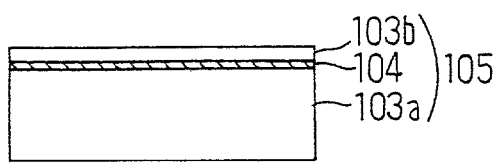
FIGS. 13A to 13F are cross-sectional views showing a method for manufacturing the acceleration sensor in the second embodiment in a stepwise manner.

First, as shown in FIG. 13A, the SOI substrate 105 is prepared. The SOI substrate 105 has a structure in which the second semiconductor layer 103b is formed on the first semiconductor layer 103a as a base with the embedded oxide film 104 interposed therebetween.

Figure 13D:
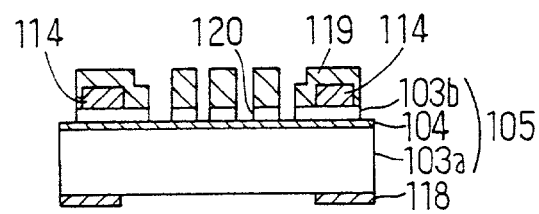
Figure 13B:
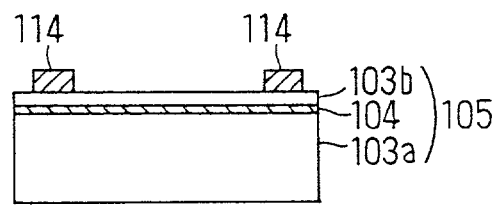

Successively, as shown in FIG. 13B, an electrode pad formation step is carried out. In the electrode pad formation step, aluminum is deposited on the entire surface of the second semiconductor layer 103b to form a thin film, and the aluminum thin film is patterned by photolithography and etching techniques, thereby forming the electrode pads 114 (114a, 114b, 114c, 114d). This electrode pad formation step may optionally involve a heat treatment (sintering) for attaining ohmic contact of the electrode pads 114.

A dimension adjustment step is carried out in this state. In the dimension adjustment step, grinding and polishing process is performed to the surface of the semiconductor layer 103a (the surface at the opposite side of the embedded oxide film 104) to adjust the thickness of the first semiconductor layer 103a. Thus, the thickness of the first semiconductor layer 103a is controlled to reduce an etching depth for forming the through hole 102a by anisotropic etching and to prevent dimensional enlargement in chip design caused by the anisotropic etching.

Figure 13E:
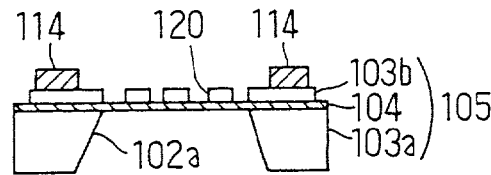
Figure 13C:
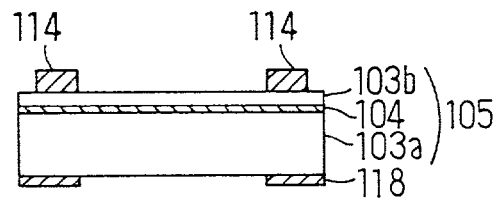

Successively, as shown in FIG. 13C, a mask formation step is carried out. In the mask formation step, after a silicon nitride film is deposited by a plasma enhanced CVD method on the entire surface of the first semiconductor layer 103a (the surface at the opposite side of the embedded oxide film 104), the silicon nitride film is patterned by the photolithography and etching techniques. Accordingly, a mask 18 for forming the through hole 102a by etching is provided. The mask may be made of other materials such as silicon oxide and resist, in addition to silicon nitride. Thus, the mask 18, which is open where the opening portion 102a is to be formed under the movable portion 108, is provided on the back surface of the SOI substrate 105.

Then, as shown in FIG. 13D, a trench formation step is carried out. In the trench formation step, resist 119 is formed on the second semiconductor layer 103 while covering the electrode pads 114, with a specific pattern (corresponding to the movable portion 108 and the fixed electrode cantilevered structures 109a, 109b). In this state, anisotropic etching is performed in a dry etching apparatus using the resist 119 as a mask. Accordingly, trenches 120 are formed in the second semiconductor layer 103b to reach the embedded oxide film 104. The trenches 120 include the through holes 117 shown in FIG. 9A. The mask maybe made of other materials such as silicon oxide and silicon nitride in addition to resist.

Next, a first etching step is carried out as shown in FIG. 13E. In the first etching step, anisotropic etching is performed to the surface of the first semiconductor layer 103a (at the opposite side of the embedded oxide film 104) by using the mask 118 and anisotropic etching aqueous solution such as KOH aqueous solution.

In this step, if the anisotropic etching progresses to the embedded oxide film 104 after removing the first semiconductor layer 103a, there is high possibility that the embedded oxide film 104 is broken by the pressure of the etching solution to damage the second semiconductor layer 103b. Therefore, the etching time is controlled so that anisotropic etching is stopped at the time when the embedded oxide film 104 is exposed. Specifically, the etching time can be controlled based on a calculation using the thickness of the first semiconductor layer 103a and an etching rate of the etching solution.

In consequence, the through hole 102a is formed in the first semiconductor layer 103a as shown in FIG. 13E by this first etching step. The mask 108 is removed after the first etching step is finished.

Figure 13F:
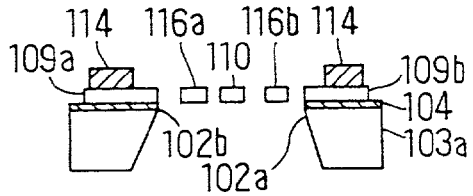

Successively, a second etching step is performed as shown in FIG. 13F. In the second etching step, in a state where the etching rate of the etching apparatus used in the trench formation step is changed, dry etching is performed to the back surface of the embedded oxide film 104 (at the side of the first semiconductor layer 103a) to thereby remove the embedded oxide film 104. As a result, the through hole 102 bis formed, the movable portion 108 is made movable, and the fixed electrode cantilevered structures 109a, 109b are cantilevered by the fixed electrode supporting portions 115a, 115b by the second etching step.

After the second etching step is performed, the SOI substrate 105 is bonded to the package 106 made of ceramic by silicone-system or epoxy system adhesive 107. After that, a dicing step is performed to dice the SOI substrate 105 into sensor chips. Thus, the manufacture of the capacitance type acceleration sensor 100 is finished.

While the present invention has been shown and described with reference to the foregoing preferred embodiment, it will be apparent to those skilled in the art that changes in form and detail may be made therein without departing from the scope of the invention as defined in the appended claims.

For example, the present invention can be applied to various semiconductor dynamic quantity sensors for detecting dynamic quantities such as an angular velocity sensor, a yaw sensor and a pressure sensor, in addition to an acceleration sensor.

What is claimed is:

1. A semiconductor dynamic quantity sensor comprising:
   a support substrate having an opening portion open on a surface thereof;
   first and second movable electrode supporting portions fixed to the support substrate;
   a movable electrode supported by the first and second movable electrode supporting portions to be displaced in accordance with a dynamic quantity applied thereto;
   first and second fixed electrode supporting portions fixed to the support substrate; and
   a fixed electrode supported by the first fixed electrode supporting portion at a first end of the fixed electrode and the second fixed electrode supporting portion at a second end of the fixed electrode and facing the movable electrode with a detection interval defined therebetween, the detection interval being changed to detect the dynamic quantity when the movable electrode is displaced, wherein
      the first and second movable electrode supporting portions are provided on opposed sides of the opening portion; and
      the first and second fixed electrode supporting portions are provided on the opposed sides of the opening portion.

2. The semiconductor dynamic quantity sensor according to claim 1, wherein an axis connecting the first and second movable electrode supporting portions is approximately parallel to an axis connecting the first and second fixed electrode supporting portions.

3. The semiconductor dynamic quantity sensor according to claim 1, wherein the opening portion is generally rectangular.

4. The semiconductor dynamic quantity sensor according to claim 1, wherein:
   the movable electrode has a weight portion that is connected to the first and second movable electrode supporting portions at both ends thereof, and has a pole portion protruding from the weight portion;
   the fixed electrode has a connecting portion that is connected to the first and second fixed electrode supporting portions at both ends thereof, and has a pole portion protruding from the connecting portion and having a side face facing a side face of the pole portion of the movable electrode.

5. A semiconductor dynamic quantity sensor comprising:
   a support substrate having an opening portion open on a surface thereof;
   first and second movable electrode supporting portions fixed to the support substrate;
   a moveable electrode supported by the first and second movable electrode supporting portions to be displaced in a displacement direction in accordance with a dynamic quantity applied thereto;
   first and second fixed electrode supporting portions fixed to the support substrate; and
   a fixed electrode supported by the first fixed electrode supporting portion at a first end of the fixed electrode and the second fixed electrode supporting portion at a second end of the fixed electrode and facing the movable electrode with a detection interval defined therebetween, the detection interval being changed to detect the dynamic quantity when the movable electrode is displaced, wherein the first and second movable electrode supporting portions are arranged in a direction approximately parallel to a direction in which the first and second fixed electrode supporting portions are arranged.

6. The semiconductor dynamic quantity sensor according to claim 5, wherein the direction in which the first and second movable electrode supporting portions and the first and second fixed electrode supporting portions are respectively arranged is approximately parallel to the displacement direction of the movable electrode.

7. The semiconductor dynamic quantity sensor according to claim 5, wherein:
   one of the first and second movable electrode supporting portions and one of the first and second fixed electrode supporting portions are provided on a first side of the opening portion; and
   another one of the first and second movable electrode supporting portions and another one of the first and second fixed electrode supporting portions are provided on a second side of the opening portion opposed to the first side.

8. The semiconductor dynamic quantity sensor according to claim 7, wherein the movable electrode and the fixed electrode respectively have pole portions facing each other with the detection interval defined therebetween, the pole portions extending approximately in parallel with the first side and the second side of the opening portion.

9. A semiconductor dynamic quantity sensor comprising:
   a frame member formed of silicon and including a first frame part, an opposing second frame part, and an opening defined by, and located between, the first frame part and the second frame part;
   an insulation layer formed on a surface of the frame member;
   a movable electrode having a detection surface and being supported above the opening in a displacement direction by first and second movable electrode anchor portions that are respectively anchored via the insulation layer to the first frame part and the second frame part, the movable electrode being displaceable in the displacement direction in response to a dynamic quantity applied thereto;
   a movable electrode pad located on at least one of the first and second frame parts and being in electrical communication with the movable electrode;
   a pair of fixed electrodes each fixed on the frame member via the insulation layer and each having a detection surface facing the detection surface of the movable electrode while defining a detection interval that is changed to detect the dynamic quantity when the movable electrode is displaced by the dynamic quantity; and
   a pair of fixed electrode pads located adjacent the movable electrode pad on only one of the first and second frame parts and each being in electrical communication with one of the pair of fixed electrodes, wherein
   a difference between a width of the first frame part and a width of the second frame part in the displacement direction is 15% or less of a smaller of the width of the first frame part and the width of the second frame part in the displacement direction.

10. A semiconductor dynamic quantity sensor according to claim 9, wherein a difference between the width of the first frame part and the width of the second frame part is 10% or less of the smaller of the width of the first frame part and the width of the second frame part.

11. A semiconductor dynamic quantity sensor according to claim 9, wherein the first frame part and the second frame part are formed from a first semiconductor layer, and the opening comprises a through hole that is formed in, and therefore penetrates, the first semiconductor layer.

12. A semiconductor dynamic quantity sensor according to claim 11, wherein the movable and fixed electrodes are formed from a second semiconductor layer located above the first semiconductor layer, the second semiconductor layer being separated from the first semiconductor layer by an oxide film embedded therebetween and including a through hole corresponding generally to the through hole formed in the first semiconductor layer.

13. A semiconductor dynamic quantity sensor according to claim 9, wherein the movable electrode includes a weight portion that is integrally connected to the first and second movable electrode anchor portions through respective first and second rectangular frame shaped beam portions.

14. A semiconductor dynamic quantity sensor comprising:
a support substrate having an opening portion open on a surface thereof;
first and second movable electrode supporting portions fixed to the support substrate;
a movable electrode supported by the first and second movable electrode supporting portions to be displaced in accordance with a dynamic quantity applied thereto;
first and second fixed electrode supporting portions fixed to the support substrate; and
a fixed electrode supported by the first and second fixed electrode supporting portions and facing the movable electrode with a detection interval defined therebetween, the detection interval being changed to detect the dynamic quantity when the movable electrode is displaced, wherein:
the first and second movable electrode supporting portions are provided on opposed sides of the opening portion;
the movable electrode has a weight portion that is connected to the first and second movable electrode supporting portions at both ends thereof, and has a pole portion protruding from the weight portion;
the fixed electrode has a connecting portion that is connected to the first and second fixed electrode supporting portions at both ends thereof, and has a pole portion protruding from the connecting portion and having a side face facing a side face of the pole portion of the movable electrode; and
the connecting portion of the fixed electrode has a bent portion that is bent to extend toward one of the first and second movable electrode supporting portions.

15. A semiconductor dynamic quantity sensor comprising:
a support substrate having an opening portion open on a surface thereof;
first and second movable electrode supporting portions fixed to the support substrate;
a movable electrode supported by the first and second movable electrode supporting portions to be displaced in accordance with a dynamic quantity applied thereto;
first and second fixed electrode supporting portions fixed to the support substrate; and
a fixed electrode supported by the first and second fixed electrode supporting portions and facing the movable electrode with a detection interval defined therebetween, the detection interval being changed to detect the dynamic quantity when the movable electrode is displaced, wherein:
the first and second movable electrode supporting portions are provided on opposed sides of the opening portion;
the movable electrode has a weight portion that is connected to the first and second movable electrode supporting portions at both ends thereof, and has a pole portion protruding form the weight portion;
the fixed electrode has a connecting portion that is connected to the first and second fixed electrode supporting portions at both ends thereof, and has a pole portion protruding from the connecting portion and having a side face facing a side face of the pole portion of the movable electrode;
the fixed electrode has two pole portions respectively protruding from the connecting portion; and
the connecting portion is widened at a portion connecting the two pole portions.

* * * * *